April 1, 1941.  E. McCORMICK  2,236,803

GOVERNOR CONTROL MECHANISM

Filed Dec. 28, 1939

INVENTOR:
ELMER McCORMICK
BY
ATTORNEYS.

Patented Apr. 1, 1941

2,236,803

UNITED STATES PATENT OFFICE 2,236,803

GOVERNOR CONTROL MECHANISM

Elmer McCormick, Waterloo, Iowa, assignor to John Deere Tractor Company, Waterloo, Iowa, a corporation of Iowa Application December 28, 1939, Serial No. 311,345

4 Claims. (Cl. 123—98)

The present invention relates generally to governor-controlled engines, and is in the nature of an improvement in the governor mechanism for tractors and similar machinery disclosed in Patent No. 2,159,233, granted to Elmer McCormick on May 23, 1939. In the aforementioned patent, the governor mechanism is provided with a spring and manually operated control means for adjusting the spring tension to cause the motor to run faster or slower, but the maximum engine speed attainable with such control means is considerably less than the maximum speed of which the engine is capable owing to the restraining influence of the governor.

It is sometimes desirable to operate the engine at a higher speed than the maximum permitted by the governor as, for example, when transporting the tractor over the highway, or otherwise operating under light load, and with this in mind, it is the principal object of the present invention to provide adjustable means, under the control of the operator, for regulating the throttle or other speed regulating means to accelerate the engine up to the maximum speed of which the engine is capable for any given load. One of the advantageous features of my invention is that it is possible to accelerate the engine momentarily for a burst of speed without disturbing the setting of the governor adjustment, and the normal operating engine speed is automatically resumed upon release of the engine accelerating means.

Figure 2:
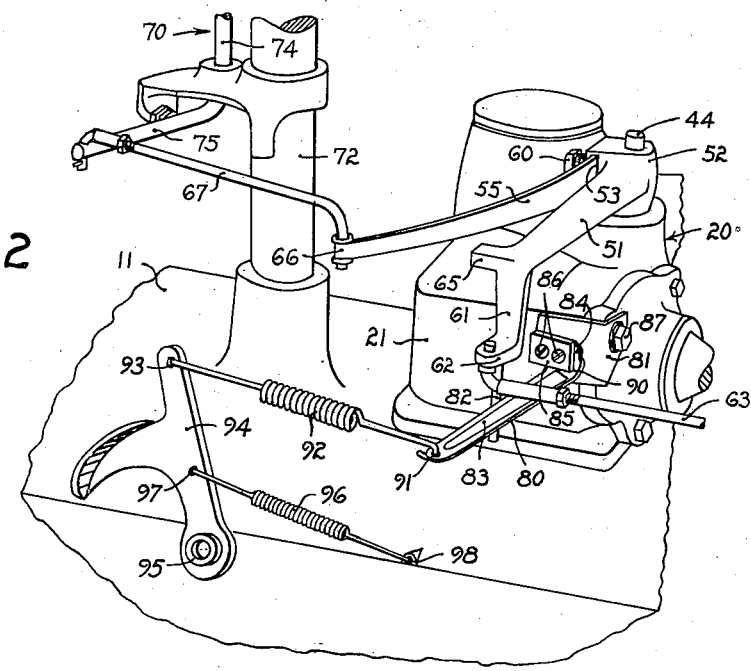
Figure 1:
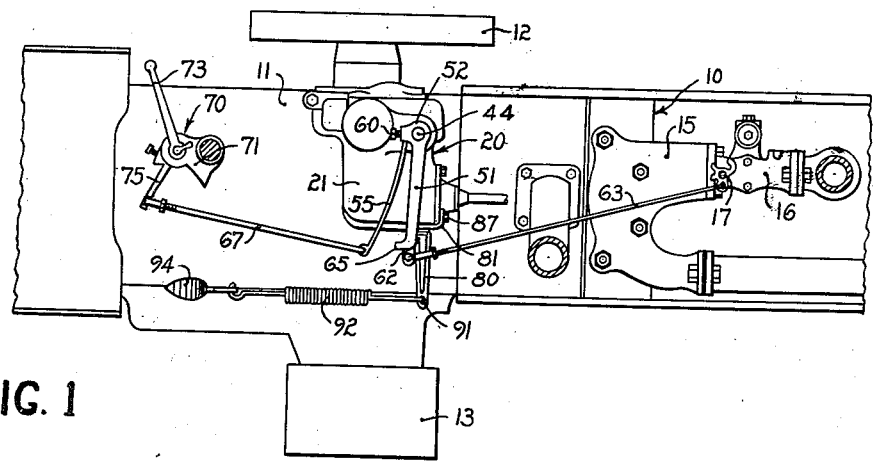

Other objects and advantages of the present invention will become apparent to those skilled in the art after consideration of the following detailed description of the preferred embodiment thereof, reference being had to the accompanying drawing, in which Figure 1 is a top plan view of a portion of the power plant and associated parts of a farm tractor of the two cylinder horizontal type and embodying the present invention; and Figure 2 is an enlarged perspective view of the governor control mechanism.

Referring now to the drawing, the reference numeral 10 indicates the tractor motor in its entirety, said motor having a combined crank case and transmission housing 11 in which is journaled the crank shaft having the flywheel 12 and belt pulley 13 mounted on opposite ends thereof. The motor 10 is provided with a manifold 15 to which is connected a carburetor 16 of conventional construction having a throttle valve 17.

The governor mechanism for the tractor is indicated in its entirety by the reference numeral 20 and includes a governor housing 21 suitably mounted on the top of the crank case 11. The construction and operation of the governor mechanism is described in detail in the aforementioned patent, and it is deemed sufficient for the purpose of the present invention to state that the mechanism consists of the usual fly balls which are rotated at a speed proportional to the speed of rotation of the engine and tend to swing outwardly under centrifugal force. This motion is transmitted to a vertically disposed governor shaft 44, the upper end of which projects out through the top of the governor housing 21 and has an arm 51 fixedly secured thereto.

The governor arm 51 is formed with an apertured boss 52 at its inner end and is adapted to receive the upper end of the governor shaft 44. A tapered leaf spring 55 is suitably secured at its inner end in a notch or groove 53 provided in the boss 52, and a set screw 60 is inserted through suitable openings in the leaf spring 55, boss 52, and shaft 44 and has threads engaging boss 52 to secure the three members tightly together. The outer end of the governor arm 51 is bent downwardly at 61 and then horizontally again at 62, and is provided with an opening to receive one end of a rod 63 which is connected at its other end with the carburetor throttle valve 17. A projection 65 is formed on the outer end of the governor arm 51 at substantially right angles to the axis of the arm and is engageable with the outer end portion of the spring 55 so as to limit the relative movement between the parts 51 and 55 in one direction.

The outermost end of the spring 55 is formed with an eye 66 to receive one end of a rod 67, said rod being utilized as a connection between the spring and a hand throttle unit 70 mounted on a bracket 71 fixed to the steering wheel support post 72 of the tractor. The hand throttle unit 70 includes an arm 73 which is mounted on the upper end of a vertical shaft 74 and is adapted to be retained in any position to which it may be moved. The lower end of the shaft 74 is bent outwardly to form an arm 75 which is apertured at its outer end to receive the angularly bent end of the rod 67.

As the engine speed accelerates, the governor mechanism acts to swing the governor arm 51 in a counterclockwise direction against the pressure of the spring 55, moving the throttle valve 17 toward closed position. The extent of closing depends, of course, upon the setting of the hand lever 73 which is adjustable to increase or decrease the tension in the spring 55 anchored to the arm 51. If the hand lever 70 is adjusted to impose more tension on the spring 55, it is obvious that the engine must operate at a higher speed in order that the centrifugal force of the governor weights may be great enough to balance the increased spring pressure.

In order that the engine may be made to operate at the maximum speed without the restraining influence of the governor, auxiliary control means is provided for limiting the movement of the governor arm in throttle-closing direction, or for moving the governor arm in throttle-opening direction. In its preferred form, such auxiliary control means consists of a lever arm 80 which is anchored by means of a bracket 81 to the side of the governor housing 21, and which is engageable with a downwardly extending rod 82 fixed to the under side of the governor arm portion 62. The arm 80 is preferably formed of heavy gauge sheet metal, with a strengthening rib 83 extending centrally along the length thereof, and an angularly bent securing portion 84. An apertured plate 85 bears against the outside face of the securing portion 84 and is secured by screws 86 to the bracket member 81 which is bolted, in turn, at 87 to the governor housing 21. A flexible curved portion 90 is provided at the junction of the securing portion 84 with the ribbed arm 80, and this flexible portion serves as a hinge to allow the arm to swing through a limited arc in a horizontal plane.

The outer end of the arm 80 is apertured at 91 to receive one of the hooked ends of a spring 92, and the other end of the spring is hooked through an aperture 93 in a foot pedal 94 which is pivotally mounted at 95 on the crank case 11. A second spring 96 is fastened at 97 to the pedal 94 and anchored at 98 to the crank case 11 for returning the pedal to its position of rest when the operator's foot is removed therefrom. The purpose of the spring 92 is to cushion the transmission of force from the pedal 94 to the arm 80 and protect the governor and throttle against damage from rough or careless application of the pedal.

The operation of my invention is as follows: When it is desired to increase the engine speed above the speed for which the governor is set, the operator presses downwardly on the foot pedal 94, causing the lever arm 80 to be pulled rearwardly. The arm 80 engages the rod 82 on the governor arm 51, pulling the latter back with the arm 80 in a clockwise direction and opening the throttle valve 17 on the carburetor. The action of the governor tending to swing the arm 51 in a counter-clockwise direction to close the throttle is resisted by the limit stop arm 80, and the restraining influence of the governor is thereby eliminated. When the operator's foot is removed from the pedal 94, the arm 80 returns to its normal position and the governor arm 51 is again free to swing clockwise under the action of the governor to limit the engine speed.

While I have shown and described above the preferred embodiment of my invention, it is to be understood that my invention is not to be limited to the specific details or application shown and described, but that, in fact, widely different means may be employed in the practice of the broader aspects of my invention. For example, my invention would be equally adapted for use on a Diesel or semi-Diesel engine wherein the governor is connected with the fuel pump, or on a steam engine wherein the governor is connected with a steam valve.

What I claim, therefore, and desire to secure by Letters Patent is:

1. Speed control mechanism for a tractor or the like having a speed responsive governor and a carburetor having a throttle valve, said mechanism comprising a governor-actuated arm connected with the throttle valve, a leaf spring member connected with said arm, said arm being swingable away from said leaf spring member to close the throttle valve of the carburetor against the bias of the spring and engaging the latter when moved in the other direction, whereby movement of the governor arm in said other direction is limited, and control means engageable with said governor arm for moving the same toward said leaf spring member against the action of said governor to increase the engine speed above normal.

2. Speed control mechanism for a tractor or the like having a speed responsive governor and a carburetor having a throttle valve, said mechanism comprising a governor-actuated arm mounted for movement about a pivot on the tractor and operatively connected to open and close said throttle valve, a spring member connected at one end with said arm and adapted to oppose closing movement of the valve, control means connected with the other end of said spring member for governing the amount of force exerted by the spring against the arm in any given position of the latter, a resilient limit stop arm fixedly secured at one end thereof to the tractor and engageable with said governor arm to limit the throttle-closing movement thereof, and a manually operable control member connected with the other end of said limit stop arm for bending the latter to decrease the extent of throttle-closing movement of the governor arm.

3. In combination with an engine having a speed responsive governor and a carburetor having a throttle valve, a governor actuated arm pivoted on said engine and connected with said throttle valve to open or close the same, a spring connected with said governor arm, an adjustable control device for regulating the tension in said spring to increase or decrease the engine speed, a second control device supported on the engine for relative movement, and lost motion means connecting said second control device with said governor-actuated arm whereby the latter can be moved to throttle-opening position independently of said first mentioned control device.

4. In an engine having speed regulating means and a governor operatively connected thereto to move said regulating means in one direction responsive to acceleration of the engine speed, resilient means biasing said regulating means in the opposite direction, a first control means for adjusting the pressure of said resilient means for adjustably setting the governed speed of said engine, a second control means, and a lost motion connection between said second control means and said speed regulating means, for actuating the latter to accelerate said engine independent of said first control means.

ELMER McCORMICK.